United States Patent [19]
Kaleniecki et al.

[11] Patent Number: 5,651,567
[45] Date of Patent: Jul. 29, 1997

[54] MULTI-PASSAGE BEARINGLESS FLUID COUPLER

[76] Inventors: James F. Kaleniecki, 3131 Hartford Ct., Rochester Hills, Mich. 48306-2905; Gerald R. Kaleniecki, 4721 Orchard, Dearborn, Mich. 48126

[21] Appl. No.: 580,432

[22] Filed: Dec. 27, 1995

[51] Int. Cl.$^6$ ................................................ F16L 39/04
[52] U.S. Cl. ...................... 285/121.3; 285/190; 285/279
[58] Field of Search ................................. 285/134, 136, 285/190, 279

[56] References Cited

U.S. PATENT DOCUMENTS

| | | |
|---|---|---|
| 2,390,892 | 12/1945 | McCormack . |
| 2,653,041 | 9/1953 | Wilson . |
| 2,723,136 | 11/1955 | Deubler . |
| 3,002,769 | 10/1961 | Deubler et al. . |
| 3,211,471 | 10/1965 | Darlington . |
| 3,273,592 | 9/1966 | Deubler et al. . |
| 3,405,959 | 10/1968 | Walker . |
| 3,414,918 | 12/1968 | Petrie et al. ................ 285/134 X |
| 3,450,423 | 6/1969 | Favre . |
| 3,889,983 | 6/1975 | Frieze et al. . |
| 4,296,952 | 10/1981 | McCracken . |
| 4,632,431 | 12/1986 | McCracken . |
| 4,683,912 | 8/1987 | Dubrosky ................ 285/134 X |
| 4,817,995 | 4/1989 | Deubler et al. . |
| 4,928,997 | 5/1990 | Reisener et al. . |
| 5,022,686 | 6/1991 | Heel et al. ................ 285/134 |
| 5,067,753 | 11/1991 | Porel . |
| 5,174,614 | 12/1992 | Kaleniecki ................ 285/279 |
| 5,458,375 | 10/1995 | Anspach et al. ............ 285/134 |

FOREIGN PATENT DOCUMENTS

| | | | |
|---|---|---|---|
| 493196 | 5/1950 | Belgium | 285/134 |
| 1214567 | 4/1966 | Germany | 285/134 |

Primary Examiner—Dave W. Arola
Attorney, Agent, or Firm—Harness Dickey & Pierce P.L.C.

[57] ABSTRACT

A multi-passage bearingless fluid coupler providing an interface between a rotating machine tool spindle and a non-rotating coolant hose. The coupler includes a housing that defines a chamber that has an aperture and first and second fluid inlet ports. A stator member is operatively mounted within the housing chamber and includes a proximal end communicating with the chamber aperture and defining an axial sealing face. The stator member also includes a distal end communicating with the first fluid inlet port. Additionally, the piston includes a first fluid passage defined by a co-axial bore and a second fluid passage defined by a plurality of co-axial bore spaced apart from one another peripherally around the first fluid passage. The coupler also includes a bearingless rotor member mounted for rotation relative to the piston about an axis having a proximal end and a distal end. The proximal end defines an axial sealing face that abuts the piston axial sealing face to form a fluid tight coupling. The distal end is connectable to a workpiece spindle. A biasing member biases the piston axial face into abutting fluid tight contact with the rotor axial face. The coupler facilitates discrete transfer of fluids input into the first and second inlet ports through the first and second passages, respectively, to the workpiece through the workpiece spindle.

18 Claims, 3 Drawing Sheets

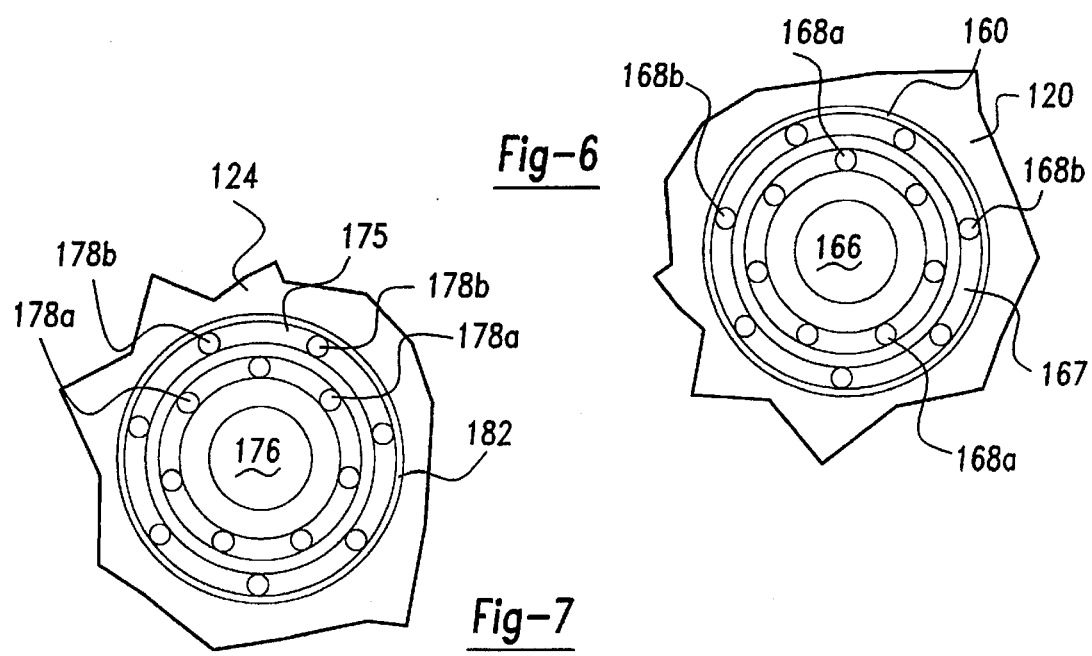
Fig-6
Fig-7
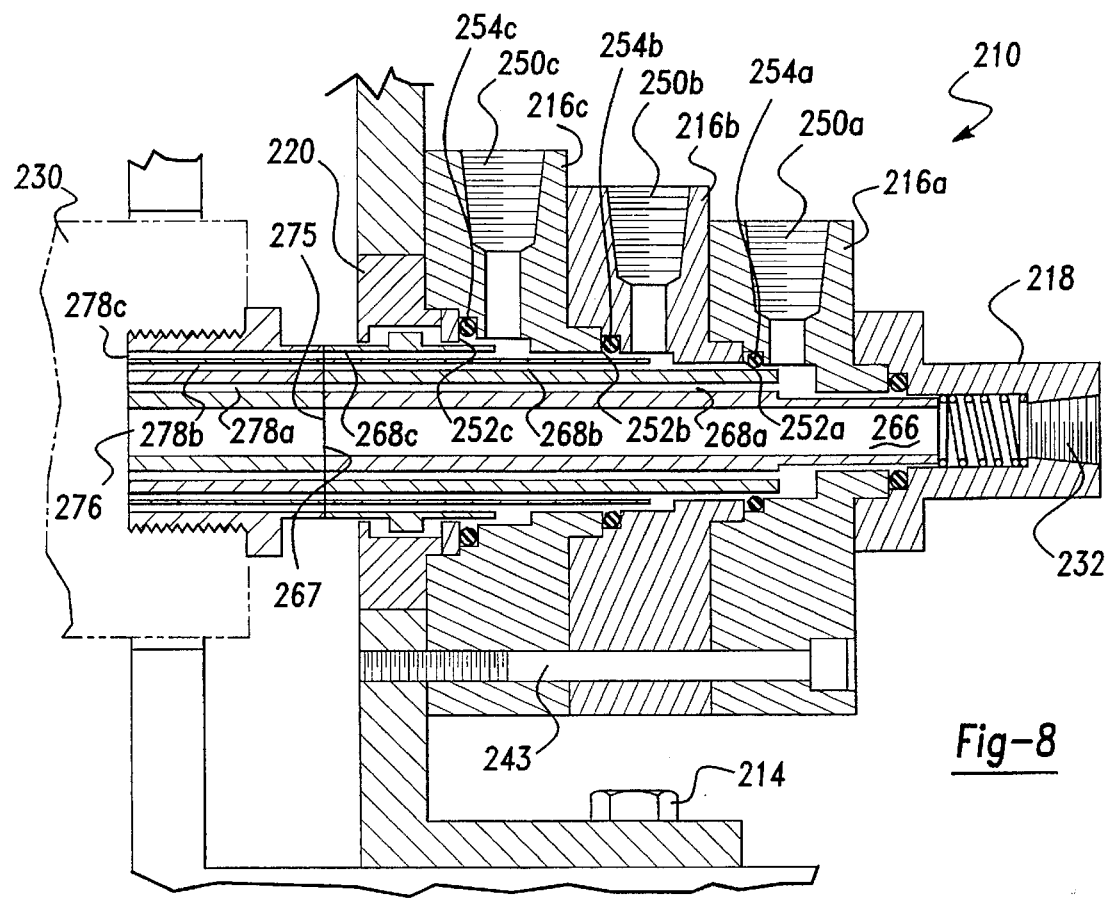
Fig-8

MULTI-PASSAGE BEARINGLESS FLUID COUPLER

BACKGROUND OF THE INVENTION

The present invention relates generally to rotary mechanical fluid couplers, and more particularly to a multiple passage fluid coupler in which multiple fluids may be separately transferred to a workpiece through a combination non-rotating coupler member and a rotating coupler member.

For years, bearing-type fluid couplers have been utilized in coolant machining operations as an interface between non-rotating coolant supply hoses and rotating tool machine spindles. A typical bearing-type coupler includes a rotatable spindle adaptor having a co-axial fluid passage and a generally non-rotatable piston member having a co-axial fluid passage communicating with the adaptor fluid passage. Both components are assembled in concentric relation in a common housing. The piston and spindle adaptor are axially biased towards one another such that opposing faces of each component abut one another, thereby defining a seal interface. A mechanical seal placed around this interface forms a fluid-tight coupling of the two components. The spindle adaptor is typically supported by and journalled on coupler bearings at a first end proximate with the seal interface for rotation and is typically threadably connected to, and rotatable with, a machine spindle at its second end.

Regardless of the quality of machine tooling, the machine spindle, or the particular manufacturing process implemented, overall system quality level in the machining industry is typically affected by this bearing-type coupler for several reasons. First, today's machining industry requirements often dictate that machining operations be performed at relatively high speeds, typically at 4,000 rpm or higher. In addition, present machining operations typically require frequent machine stops and starts. Bearing-type couplers, while having satisfactory performance characteristics at speeds of around 2,500 rpm and while operating without frequent starts and stops, typically malfunction under the aforementioned more demanding conditions. Such malfunction typically is a result of rapid wear of the coupler bearings and the subsequent failure of the bearings due to overheating resulting from these conditions.

Second, present machining operations often require that fluids other than coolants be supplied to the tooling machines. Mechanical seals typically isolate bearings in bearing-type couplers from these fluids. However, these seals occasionally fail after long periods of use, thereby allowing fluid to leak into the coupler bearing housing. When exposed to these fluids, the coupler bearings often fail, thus resulting in the expense of coupler replacement and associated costs dues to machine down time.

Third, conventional bearing-type couplers often are connected to machine spindles in an unsupported manner, as typically there are no mounting support brackets associated with these couplers. As a result, a significant load is placed on the spindle. This load typically induces vibrations, which are often transmitted to the spindle bearing. Such vibrations decrease the life of the spindle bearing, the coupler bearings, and often affect machining accuracy, resulting in machined parts that do not meet spec. In addition, such induced vibrations often result in damaging and/or breaking of the cutting tool. Further, the induced vibrations significantly decrease the life of the coupler itself by accelerating bearing coupler wear and failure rates.

Fourth, coupler bearings incorporated within bearing-type couplers increase maintenance costs, as the bearings must be periodically lubricated. If the bearing couplers are not properly lubricated, bearing wear is significantly increased. As the bearings become worn, vibrations are induced, resulting in the above-mentioned problems.

In the past, several modifications have been introduced into machining systems in an attempt to minimize the above-mentioned limitations induced by bearing couplers. Such modifications have included the installation of swallow-type spindles, adapters, or dual coolant circuits into the machining operations in an attempt to reduce coupler induced vibration and in order to prolong the life of the coupler itself. However, such modifications have exhibited limited effectiveness and have added expense to the overall machining operation.

Subsequently, the introduction of bearingless couplers into the above-mentioned high speed, high pressure coolant machining operations has allowed many of the above-mentioned drawbacks associated with bearing couplers to be overcome. Such a bearingless coupler is disclosed in U.S. Pat. No. 5,174,614 entitled "Bearingless Rotary Mechanical Fluid Coupling", issued Dec. 29, 1992 to Kaleniecki, assigned to the assignee of the present application, and incorporated by reference herein. Such a bearingless coupler functions under operating conditions that would severely limit the life of a bearing-type coupler. In particular, the bearingless coupler is not affected by frequent spindle starts and stops, and can function at significantly higher spindle speeds. Also, the bearingless coupler is not affected when liquids other than coolants are passed through the spindle, as no coupler bearings, and thus no mechanical bearing seals are present. Further, a bearingless coupler such as that disclosed in assignee's aforementioned patent is bracket mounted, thereby minimizing the load placed on the tool spindle and thereby damping, and thus minimizing, vibrations transmitted from the coupler to the spindle. As a result, higher quality parts can be manufactured and damage to cutting tools and tool spindles is minimized. Additionally, system cost is reduced, as such a bearingless coupler is relatively maintenance free, thereby minimizing system down time.

While the assignee's aforementioned patent exhibits superior results when compared to bearing-type couplers, there is still a need for further advancement in the art. In particular, today's increasingly demanding machining requirements often require that two or more discrete quantities of coolants or other types of fluids be supplied to the machining operation simultaneously. While the aforementioned single passage bearingless coupler exhibits superior performance characteristics, there is thus a need in the art for a multi-passage bearingless fluid coupler that is capable of supplying two or more discrete quantities of fluids simultaneously to a tooling machine.

There is a further need for a multi-passage bearingless fluid coupler that may be adapted to fit any of a number of particular types of coupler requirements.

Thus, there is a need for a bearingless fluid coupler that exhibits all of the superior performance characteristics of the assignee's aforementioned patented bearingless coupler, while in addition being capable of supplying two or more discrete quantities of fluids simultaneously to a cutting tool.

SUMMARY OF THE INVENTION

Accordingly, the present invention provides a multi-passage bearingless fluid coupler that provides a solution for the aforementioned needs. The multi-passage coupler of the present invention is relatively maintenance free, is bracket mounted and therefore has little associated induced vibration, and can be operated with frequent starts and stops and at relatively high rotational speeds. In addition, the coupler of the present invention has multiple passages and can therefore transfer fluids from discrete fluid supplies to a workpiece with no intermixing of the fluids.

Accordingly, a preferred embodiment of the present invention provides a multiple-passage bearingless fluid coupler that facilitates transfer of fluids from a non-rotating fluid supply base to a rotating workpiece spindle. The coupler includes a housing that defines a chamber that has an aperture and first and second fluid inlet ports. A stator member is operatively mounted within the housing chamber and includes a proximal end communicating with the chamber aperture and also defining an axial sealing face. The stator member also includes a distal end communicating with the first fluid inlet port. Additionally, the piston includes a first fluid passage defined by a central co-axial bore and a second fluid passage defined by a plurality of co-axial bores spaced apart from one another peripherally around the first fluid passage. The coupler also includes a bearingless rotor member mounted for rotation relative to the piston about an axis and having a proximal end and a distal end. The proximal end defines an axial sealing face that abuts the piston axial sealing face to form a fluid tight coupling. The distal end is connectable to a workpiece rotor member. A biasing member biases the piston axial face into abutting fluid tight contact with the rotor axial face. The coupler facilitates discrete transfer of fluids input into the first and second inlet ports through the first and second passages, respectively, to the workpiece through the workpiece spindle.

Thus it is an advantage of the present invention to provide a single piece multi-passage bearingless fluid coupler that is capable of supplying two or more discrete quantities of fluids simultaneously to a tooling machine.

It is a further advantage of the present invention to provide a multi-passage bearingless fluid coupler that may be adapted to fit any of a number of particular types of coupler requirements.

It is a further advantage of the present invention to provide a bearingless fluid coupler that exhibits all of the superior performance characteristics of the assignee's aforementioned patented bearingless coupler, while in addition being capable of supplying two or more discrete quantities of fluids simultaneously to a cutting tool, or any rotating device requiring fluids for some purpose.

BRIEF DESCRIPTION OF THE DRAWINGS

FIG. 6 is an end view of the coupler piston of FIG. 5;

FIG. 7 is an end view of the coupler spindle adaptor of FIG. 5; and

FIG. 8 is a cross-sectional view of a four passage modular bearingless fluid coupler according to a third preferred embodiment of the present invention.

DETAILED DESCRIPTION OF A PREFERRED EMBODIMENT

Figure 1:
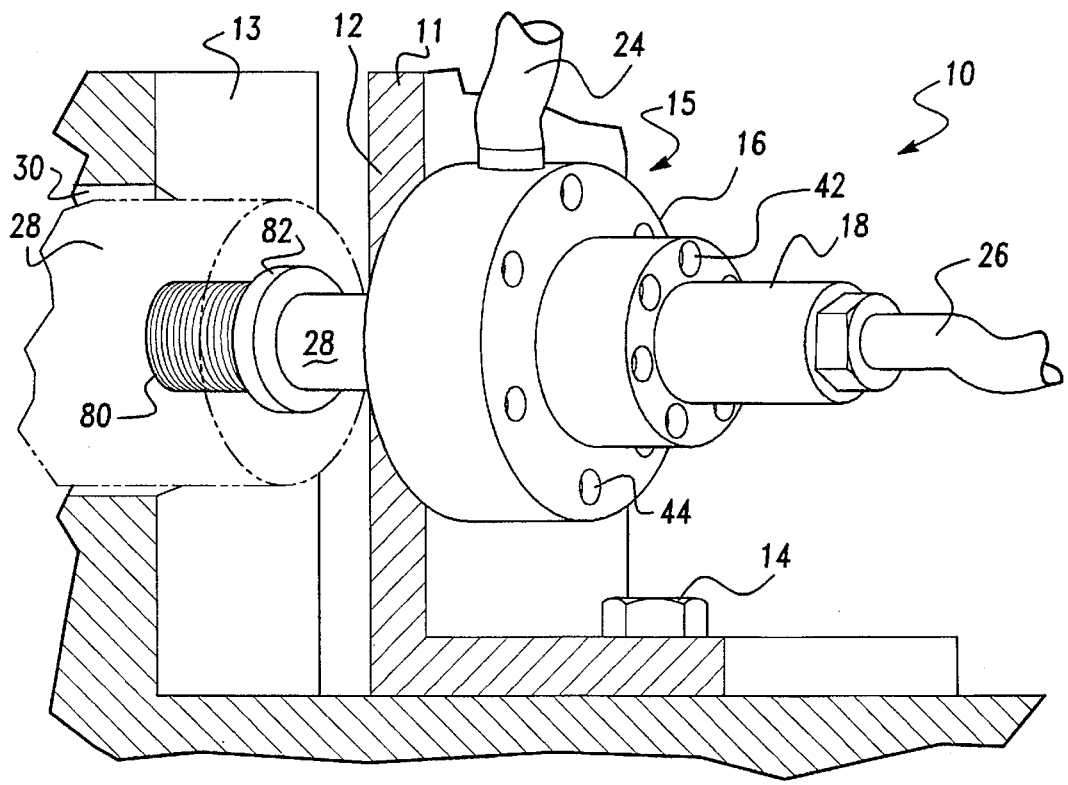
FIG. 1 is a perspective view of a dual passage bearingless mechanical fluid coupling according to a preferred embodiment of the present invention.

FIG. 1 shows a dual passage bearingless fluid coupler according to the preferred embodiment of the present invention generally at 10. This dual passage bearingless fluid coupler exhibits all of the superior performance characteristics of the bearingless coupler disclosed in U.S. Pat. No. 5,174,614 to Kaleniecki, which is assigned to the assignee of the present application and which has been incorporated by reference herein. Namely, the dual passage coupler of the present invention is bearingless and thus, unlike conventional bearing-type fluid couplers, does not require periodic lubrication. The coupler of the present invention also is not affected by frequent spindle starts and stops and can function at significantly higher spindle speeds than can conventional bearing-type couplers. In addition, the coupler of the present invention is capable of transferring fluids other than coolants, as there are no bearings and thus no need to protect bearings from fluids which will lead to bearing failure. Further, the coupler of the present invention, due to its specific design, eliminates numerous problems associated with bearing-type couplers resulting from coupler induced vibrations. Thus, machine system down time and manufacturing costs due to bearing-type coupler maintenance, failure and replacement are reduced.

The dual passage bearingless fluid coupler of the present invention, in addition to the above characteristics associated with the assignee's patented single passage fluid coupler, represents a further advancement in the art in that two discrete fluids may be transferred from remote fluid supplies through the coupler to a workpiece spindle through two separate fluid passages. Thus, the coupler of the present invention is capable of being implemented in machining operations requiring more than a single fluid to be supplied to a workpiece, as is often the case in today's increasingly competitive and demanding machining industry.

The term "fluid" is used throughout the following description to refer to that which is transferred through the coupler 10. It should be understood that the term "fluid" refers to coolants, oils, air, gases, or any other liquid or powdered material that now, or in the future, may be utilized in machining operations.

The coupler 10 is operatively mounted to a bracket 11 through a bracket aperture 12. The bracket itself is mounted to a workpiece 13 via a bolt 14 or other similar fastening device. As mentioned above, by being bracket mounted, the coupler has no radial movement which means no vibrations, unlike bearing couplers, thereby enhancing machining operations and minimizing tool damage and machining errors typically caused by bearing-type couplers.

Figure 2:
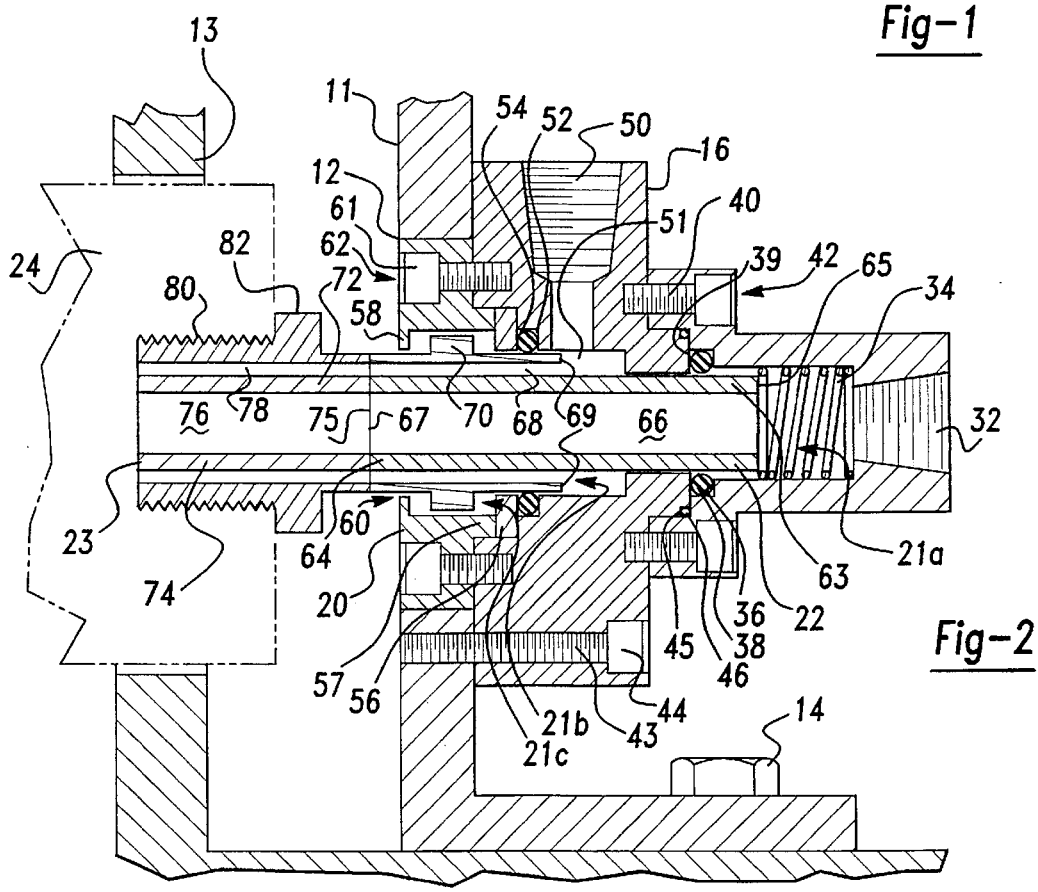
FIG. 2 is a cross-sectional view of the fluid coupler of FIG. 1.

The coupler 10 includes a housing 15 composed of a main body 16, a cylindrical extension 18 and a bracket interface plate 20 (FIG. 2). The housing components are preferably formed from machined steel. However, any durable material suited for this particular application may be used. The housing defines a chamber composed of stepped rear, intermediate and front sections 21a–21c, respectively. The chamber houses a piston 22, which is in fluid contact with a spindle adaptor 23. The spindle adaptor is external to the housing 15 and is rotatably mounted to a workpiece spindle 24. As shown in FIG. 1, a fluid hose 24 is connected to the main body 16, while a fluid hose 26 is attached to the cylindrical extension 18. Each of the fluid hoses 24, 26 are connected to a separate, remote fluid supply (not shown). As is set forth in detail below, the hoses 24, 26 each transfer a discrete quantity of fluid through the piston 22 and spindle adaptor 23 to the rotating workpiece spindle 28 rotatably mounted in a spindle bore 30.

Referring to the structure of the present invention, a threaded conical fluid inlet port 32 is defined at the distal end of the cylindrical extension 18. The inlet port 32 receives a fluid hose adaptor (not shown) operatively affixed to the end of the fluid hose 26, to form a fluid tight seal between the hose 26 and the coupler 10. The cylindrical extension 18 further defines the rear section of the chamber 21c. A biasing mechanism, such as the spring shown generally at 34, is compressibly inserted into the distal end of the chamber between the inlet port 32 and the piston 22 to bias the piston outwardly away from the port. The rear section 21c is also annularly stepped to define a counterbore 36. An O-ring fluid seal 38 is maintained within the counterbore 36 and abuts a rear face 39 of the main body 16. The cylindrical extension 18 is affixed to the main body 16 via threaded fasteners 40, maintained within fastener bores 42, defined by the cylindrical extension 18 and the main body 16.

Referring to the main body 16, an annular groove 45 is defined around the outer face of the main body. An O-ring seal 46 is maintained in abutting contact within the groove to maintain a seal fit between the cylindrical extension 18 and the main body 16. The main body 16 further defines the intermediate central section 21b of the chamber and a second threaded conical fluid inlet port 50 communicating with a first annularly stepped portion 51 of the chamber. The main body is again annularly stepped at its forwardmost end to define a counterbore 52 in which an O-ring fluid seal 54 is placed. The O-ring seal abuts a rear detente flange 56, which in turn abuts an inner flange 57 of the bracket interface 20.

The bracket interface plate 20 defines the front section 21c of the housing chamber between a rear detente flange 56 and a front detente flange 58 larger in diameter than both the intermediate and rear sections 21a, 21b. The interface plate 20 is of a diameter slightly smaller than the diameter of the bracket aperture 12, thereby allowing the plate to be inserted therein and the coupler 10 to be affixed to the bracket 12 by fasteners 44 maintained within bores 43 defined by the main body 16 and the bracket 11. The interface plate itself is affixed to the main body 16 by fasteners, such as the fastener 61, threadably inserted into bores, such as the bore shown generally at 62, defined within the bracket 12 and the main body 16.

Figure 3:
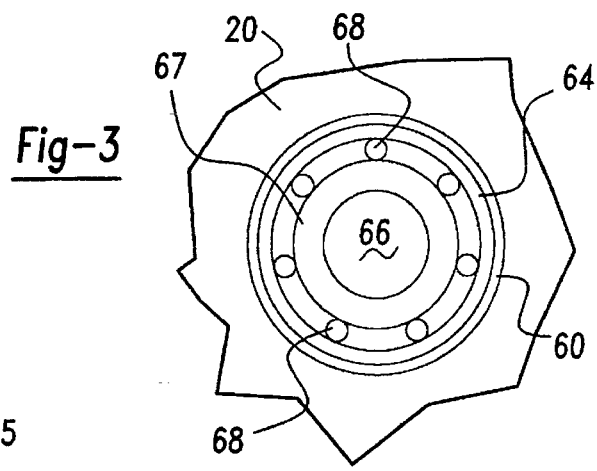
FIG. 3 is an end view of the coupler piston of FIG. 2.

Referring specifically to FIGS. 2 and 3, the piston 22 is generally cylindrical in shape and includes a distal end 63 and a proximal end 64. The distal end 63 defines a rear axial face 65 which abuts the spring 34, thereby biasing the piston 22 outwardly through the interface plate aperture 60. The proximal end 54 defines a front axial face 67 (FIG. 3) comprised of a durable, hardened material such as ceramic, tungsten carbide, silicon carbide or carbon graphite. A co-axial bore formed through the center of the piston 22 extends from the rear axial face to the front axial face and defines a first fluid passage 66.

The piston proximal end 64 is larger in diameter than the distal end 63 and also defines a second fluid passage through a set of bores 68 extending from the front axial face to the piston stepped diameter interface 69. As shown in FIG. 3, the bores 68 are spaced substantially equiangularly apart from one another around the periphery of the first fluid passage bore 66 and are in fluid communication with the second fluid inlet port 50. The proximal end of the piston 22 also includes a radial flange 70 that limits piston axial movement between the front detente flange 58 and the rear detente flange 56. The piston is mounted within the chamber such that it has a certain amount of "float", or movement in the axial and radial directions to compensate for any resulting piston/spindle adaptor misalignment.

Referring to the spindle adaptor 23, the adaptor is preferably formed from stamped metal. However, it should be appreciated that the adaptor, as with the piston, may be manufactured from any durable material particularly suited for this type of application. The adaptor includes a proximal end 72 and a distal end 74. The proximal end defines an adaptor front axial face 75 composed of ceramic, highly polished metal, or other similar material, which abuts the piston front axial face 67, thereby forming a fluid tight interface between the piston and the spindle adaptor. The spindle adaptor also includes a co-axial bore which defines a first fluid passage 76 extending from the adaptor proximal end to the distal end.

Figure 4:
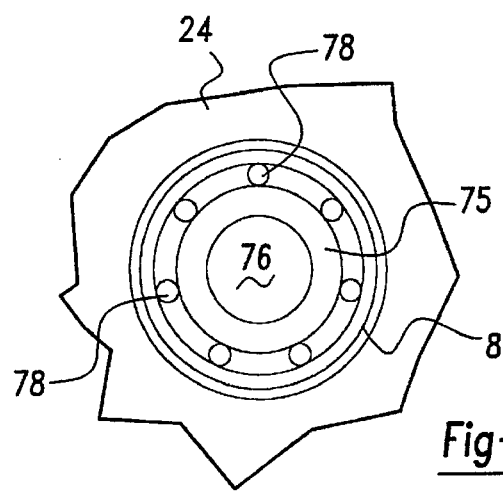
FIG. 4 is an end view of the coupler spindle adaptor of FIG. 2.

As shown in FIG. 4, the spindle adaptor also includes a set of co-axial bores that also extend from the adaptor proximal end to the distal end, thereby defining a second fluid passage. Thus, the adaptor first fluid passage 76 is axially aligned with the piston first fluid passage 66. Likewise, the adaptor second fluid passage 78 is axially aligned with the piston second fluid passage 68. The spindle adaptor includes a threaded periphery 80 that allows the adaptor to be threadably engaged with the spindle adaptor. In addition, the adaptor includes a medial annular shoulder 82 that abuts the front face of the spindle to limit the depth to which the adaptor may be threadably anchored into the spindle 30.

In operation, discrete quantities of fluids from remote fluid supplies flow through hoses 24, 26 and into the coupler 10 and through fluid inlet ports 32, 50. A first quantity of fluid passing through the fluid inlet port 32 flows through the rear section of the chamber 21a and into the piston first fluid passage 66. Fluid is effectively prevented from flowing from the rear section of the chamber into the intermediate chamber section 21b by the O-ring seal 38. The fluid within the piston first fluid passage 66 subsequently passes through the spindle adaptor first fluid passage 76 as the spindle adaptor rotates relative to the piston. The fluid then passes into the workpiece through a cooperating bore (not shown) in the rotating workpiece spindle 30.

Simultaneously, a second fluid enters the coupler 10 through the fluid inlet port 50 and into the stepped intermediate chamber section 51. The fluid passes through the chamber intermediate section 21b and into the second fluid passage defined by the apertures 68 at the piston stepped diameter interface 69. The fluid then flows through the piston second fluid passage across the fluid tight seal formed by the abutting axial faces 67, 75 and through the spindle adaptor second fluid passage 78 as the spindle adaptor rotates relative to the piston. Subsequently, the fluid in the adaptor second fluid passage flows into cooperating bores (not shown) in the spindle adaptor and into the workpiece separately from the fluid passing through the first spindle adaptor first fluid passage.

It should be appreciated at this point that the actual outer configuration of the coupler housing may be manufactured in a variety of shapes and sizes, depending on the particular application. In addition, it should be appreciated that, by implementing a piston and a spindle adaptor having axial faces formed from the above-mentioned durable hardened materials, the need for a mechanical fluid seal is eliminated, as the abutting axial faces form the actual fluid tight seal.

It should also be appreciated that the bores defining the spindle adaptor second fluid passage rotate relative to the bores defining the piston second fluid passage. However, the spindle adaptor rotates at such a speed (typically 2500 rpm or higher) that the spindle adaptor second passage bores effectively are axially aligned with successive piston second passage bores during rotation to effectively pass fluid supplied from the second fluid inlet port to the workpiece spindle.

Figure 5:
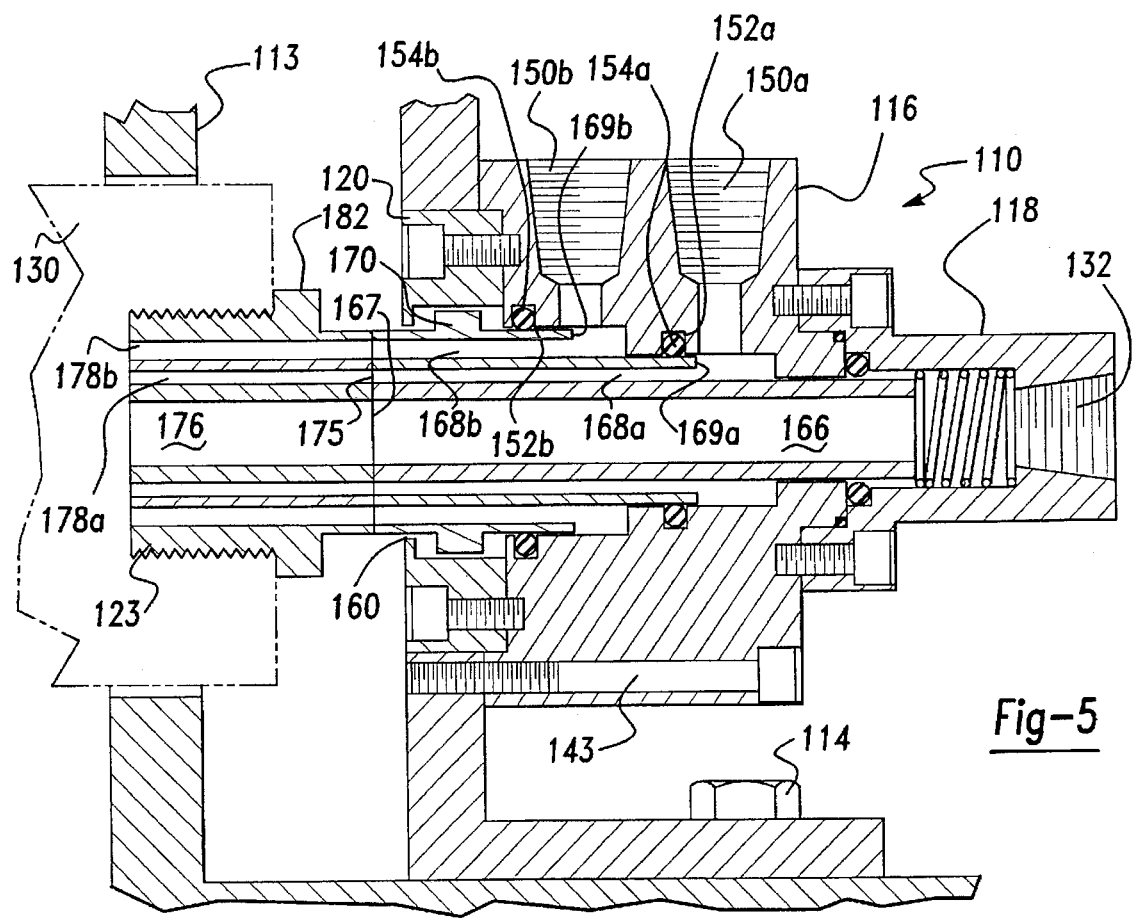
FIG. 5 is a cross-sectional view of a triple passage bearingless fluid coupler according to a second preferred embodiment of the present invention.

Referring now in detail to FIG. 5, a triple passage bearingless fluid coupler is shown generally at 110. The triple passage coupler is identical in structure and function to that of the dual passage coupler shown in FIGS. 1–4, with the addition of a third fluid passage that allows three discrete quantities of fluid to be transferred from three separate fluid supply hoses through the coupler to the workpiece 113. The coupler 110 includes a first fluid inlet port 132 in fluid communication with a piston first fluid passage 166. The piston first fluid passage 166 is in fluid communication with a spindle adaptor fluid passage 176 through a fluid tight interface formed by piston axial face 167 and spindle adaptor axial face 175. In addition, the coupler includes a second fluid inlet port 150a in fluid communication with bores 168a defining a piston second fluid passage through a first stepped chamber intermediate section 151a and bores 178a defining a spindle adaptor second fluid passage 178a. Fluid entering the fluid inlet port 132 is prevented from flowing into the bores 168a by the O-ring seal 138.

The fluid coupler main body 116 also includes an additional third fluid inlet port 150b. The fluid inlet port 150b is in fluid communication with a second stepped chamber intermediate section 151b, which is larger in diameter than the first intermediate section 151a. The piston includes bores 168b defining a third fluid passage. As shown in FIG. 6, the bores 168b extend from the second stepped interface 169b to the piston front axial face 167 and are spaced equidistantly apart from one another around the outer periphery of the piston and radially outwardly from the second fluid passage formed by the plurality of bores 168a.

As shown in FIG. 7, the spindle adaptor 123 includes bores 178b defining a third fluid passage. The bores 178b extend axially from the adaptor proximal end to the adaptor distal end and are spaced equidistantly from one another around the outer periphery of the adaptor and radially outwardly from the second fluid passage defined by the bores 178a. Fluids input through the fluid inlet ports 150a, 150b are prevented from intermixing by the fluid O-ring seal 154a. Additionally, fluid entering the fluid inlet port 150b is prevented from leaking through the housing aperture 160 due to the presence of the O-ring seal 154b. Thus, fluid input through the third fluid inlet port 150b flows through the axially aligned piston and spindle adaptor bores defining third fluid passages 168b, 178b and into the workpiece 113 through cooperating bores (not shown) in the spindle adaptor 130 separately from the fluids transferred through the first and second fluid passages.

Referring to FIG. 8, a four-passage fluid coupler is shown generally at 210. The four-passage coupler is identical in function to that of the coupler 110. Additionally, the coupler 210 includes a fourth fluid inlet port 250c, and associated fourth piston and spindle adaptor fluid passages, which allow a fourth fluid to be separately transferred from a non-rotating fluid supply hose (not shown) to the rotating spindle adaptor 230.

The structure of the coupler 210 also differs from that of the coupler 110 in that the main body, shown generally at 216, is modular. The modular main body 216 thus allows the coupler to be adapted to a particular desired application through the addition or deletion of fluid inlet ports and associated fluid passages. With the coupler shown in FIG. 6, three modular main bodies 216a, 216b, 216c are shown interconnected to one another and to the mounting bracket 212. O-ring seals 252a–252c maintain separation of fluids input through the fluid inlet ports 232 and 250a–250c.

It is contemplated that such a modular fluid coupler could be packaged in kit form. The kit would include several cooperating main body subassemblies and several corresponding pistons designed to fit a specific chamber defined by any given number of assembled main body subassemblies. The coupler 210 thus allows flexibility in the applications in which it could be used by permitting the number of fluids capable of being transferred by the coupler to be changed according to the requirements of a particular machining operation.

It should be appreciated that the multi-passage bearingless fluid coupler may be manufactured in a variety of configurations without departing from the scope of the present invention. For example, the fluid inlet ports may be located at any area on the housing and be formed to accept any particular hose adaptor as long as each part is in fluid communication with its respective fluid passage. In addition, the couple may be designed to maintain the spindle adaptor front axial face portion within the coupler housing if it is desired to manufacture the coupler as a single integrated unit. Also, a biasing mechanism could be associated with the spindle adaptor rather than the piston to effect a fluid tight seal between the two components.

Various other advantages and modifications will become apparent to one skilled in the art after having the benefit of studying the teachings of the specification, the drawings and the following claims.

What is claimed is:

1. A multi-passage fluid coupler, comprising:

a multi-piece housing defining a chamber having an aperture and first and second fluid inlet ports, and having a fluid seal between said aperture and said second fluid inlet port;

a stator member operatively mounted within said housing chamber and including a proximal end communicating with said chamber aperture and defining an axial sealing face, and a distal end in communication with said first fluid inlet port, said stator member further including a first fluid passage defined by a co-axial bore in communication with said first fluid inlet port and a second fluid passage defined by a plurality of co-axial bores spaced apart from one another peripherally around said first fluid passage;

a bearingless rotor member mounted for rotation relative to said stator member about an axis and having a proximal end and a distal end, said proximal end defining an axial sealing face abutting said stator member axial sealing face to thereby form a fluid tight coupling, said distal end being connectable to a workpiece spindle, said rotor member further including a first fluid passage defined by a co-axial bore and a second fluid passage defined by a plurality of co-axial bores spaced apart from one another peripherally around said first fluid passage, said rotor member first fluid passage communicating with said stator member first fluid passage, said rotor member second fluid passage communicating with said stator member second fluid passage;

biasing means for biasing said stator member axial face into abutting fluid tight contact with said rotor member axial face; and at least one fastener being externally accessible from said multi-piece housing to maintain said multi-piece housing in assembled form, said fastener being selectively removable to permit access to said fluid seal.

2. The multi-passage fluid coupler of claim 1, wherein said rotor member and stator member first fluid passages transfer a first fluid input through said first fluid inlet port to a workpiece and said rotor member and stator member second fluid passages transfer a second fluid input into said coupler through said second fluid inlet port.

3. The multi-passage fluid coupler of claim 1, further comprising means for sealing said first inlet port from said second inlet port.

4. The multi-passage fluid coupler of claim 1, wherein said stator member proximal end is radially stepped in relation to said stator member distal end.

5. The multi-passage fluid coupler of claim 4, wherein said plurality of co-axial bores defining said stator member second fluid passage are formed in said stator member radially stepped proximal end.

6. A multi-passage fluid coupler for transferring fluids from a non-rotating fluid supply to a workpiece through a rotating workpiece spindle, comprising:

a housing defining a piston chamber and having first and second fluid inlet ports;

a piston mounted within said chamber and being relatively movable in both an axial and a radial direction, said piston having a first co-axial fluid passage, a distal end in communication with said first fluid inlet port, a proximal end defining an axial sealing face having a highly polished surface, and a second fluid passage defined by a plurality of bores spaced substantially equiangularly apart from one another peripherally around said first fluid passage;

a spindle adaptor mounted to said workpiece externally from said housing, said spindle adaptor having a distal end adapted to interface with said workpiece spindle and a proximal end defining an axial face having a highly polished surface in abutting contact with said highly polished surface of said piston axial face to thereby form a fluid tight coupling, said spindle adaptor including a first fluid passage defined by a co-axial bore and a second fluid passage defined by a plurality of bores spaced substantially equiangularly apart from one another peripherally around said first fluid passage;

said piston and said spindle adaptor first fluid passages communicating with one another to transfer a first fluid supplied through said first fluid inlet port to said workpiece spindle as said spindle adaptor rotates relative to said piston;

said piston and spindle adaptor second fluid passages communicating with one another to transfer fluid supplied through said second fluid inlet port to said workpiece spindle discretely from said first fluid as said spindle adaptor rotates relative to said piston.

7. The multi-passage fluid coupler of claim 6, further comprising a third fluid inlet port defined in said housing and a third fluid passage defined by a plurality of co-axial bores spaced equiangularly apart from one another peripherally around said second fluid passage in both said piston and said spindle adaptor.

8. The multi-passage fluid coupler of claim 7, further comprising a fourth fluid inlet port defined in said housing and a fourth fluid passage defined by a plurality of co-axial bores spaced equiangularly apart from one another around said third fluid passage in both said piston and said spindle adaptor.

9. The multi-passage fluid coupler of claim 6, further comprising biasing means positioned within said housing chamber for biasing said piston axial face through said housing aperture and into abutting contact with said spindle adaptor axial face, to thereby maintain said fluid tight coupling between said piston and said spindle adaptor.

10. The multi-passage fluid coupler of claim 6, wherein said piston further includes a peripheral flange and said housing chamber includes proximal and distal stops, said distal stop limiting relative rearward axial movement of said piston to a position placing said piston flange in abutting contact with said distal stop, said proximal stop limiting relative forward piston axial movement to a position placing said piston flange in abutting contact with said proximal stop.

11. The multi-passage fluid coupler of claim 6, further comprising a mounting bracket to which said housing is affixed, said mounting bracket minimizing the load placed on said workpiece spindle by said multi-passage fluid coupler, thereby damping coupler-induced vibrations.

12. The multi-passage fluid coupler of claim 6, further comprising an O-ring mounted in a housing chamber counterbore for maintaining separation of first and second fluids input into said first and second fluid passages, respectively.

13. The multi-passage fluid coupler of claim 6, wherein said housing defines a third fluid inlet port and said piston and said spindle adaptor each further include a third fluid passage, said piston third fluid passage being defined by a plurality of axial bores spaced equiangularly apart from one another peripherally around said piston, said spindle adaptor third fluid passage being defined by a plurality of axial bores spaced equiangularly apart from one another peripherally around said spindle adaptor, said piston third fluid passage communicating with said spindle adaptor third fluid passage to transfer fluid supplied from said third fluid inlet port to said workpiece separately from said first and second fluids in said first and second fluid passages.

14. The multi-passage fluid coupler of claim 13, further comprising a plurality of fluid inlet ports and a plurality of fluid passages formed in a manner identical to said third fluid passage, said plurality of fluid passages each separately transferring fluids supplied from one of said additional plurality of fluid inlet ports to said workpiece spindle.

15. The multi-passage fluid coupler of claim 14, further comprising separating means for maintaining separation of said plurality of fluid passages from one another.

16. The multi-passage fluid coupler of claim 15, wherein said separating means comprises a plurality of O-rings each arranged to seal fluid flow in one of said plurality of fluid passages from fluid flow in an adjacent one of said fluid passages.

17. The multi-passage fluid coupler of claim 16, wherein each of said O-rings is maintained in an interference fit in an annular counterbore formed in said housing chamber.

18. A multi-passage coupler, comprising:

a plurality of housings each having a fluid inlet port and a chamber in communication with said fluid inlet port and each being affixable to one another to thereby form a plurality of modular housing combinations;

a plurality of stator members each structured to be maintained within and function with one of said plurality of modular housing combinations and each having a front axial face, and a plurality of fluid passages each in discrete communication with one of said fluid inlet ports;

a rotor member mounted to a workpiece spindle for rotation relative to one of said plurality of stator members, said rotor member having a front axial face abutting said stator front axial face to form a fluid tight interface, said rotor member having a plurality of fluid passages in fluid communication with said stator fluid passages; and means for maintaining said fluid tight interface between said rotor and said stator;

said multi-passage coupler being packaged in kit form to permit said coupler to be assembled with one of a plurality of stator member/housing combinations.

* * * * *